United States Patent
Kennedy et al.

(10) Patent No.: US 10,161,048 B2
(45) Date of Patent: Dec. 25, 2018

(54) COLD SPRAY POWDER FEEDERS WITH IN-SITU POWDER BLENDING

(71) Applicant: UNITED TECHNOLOGIES CORPORATION, Farmington, CT (US)

(72) Inventors: Matthew B. Kennedy, Vernon, CT (US); Justin R. Hawkes, Marlborough, CT (US); Aaron T. Nardi, East Granby, CT (US); Michael A. Klecka, Coventry, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/706,188

(22) Filed: Sep. 15, 2017

(65) Prior Publication Data
US 2018/0002816 A1 Jan. 4, 2018

Related U.S. Application Data

(62) Division of application No. 15/023,171, filed as application No. PCT/US2014/049579 on Aug. 4, 2014, now Pat. No. 9,765,436.

(60) Provisional application No. 61/883,880, filed on Sep. 27, 2013.

(51) Int. Cl.
| | |
|---|---|
| B65G 53/00 | (2006.01) |
| C23C 24/04 | (2006.01) |
| B05B 7/14 | (2006.01) |
| G01F 11/24 | (2006.01) |
| B05D 1/12 | (2006.01) |

(52) U.S. Cl.
CPC .............. *C23C 24/04* (2013.01); *B05B 7/144* (2013.01); *B05B 7/1463* (2013.01); *G01F 11/24* (2013.01); *B05D 1/12* (2013.01)

(58) Field of Classification Search
CPC .............. B65G 53/525; B65G 53/4616; B65G 11/126; G01F 11/24
USPC .................. 406/50, 64, 66, 67, 68, 85, 146; 222/373, 367, 636
See application file for complete search history.

(56) References Cited

U.S. PATENT DOCUMENTS

| | | | |
|---|---|---|---|
| 2,244,050 A | 6/1941 | Cassiere | |
| 3,863,815 A * | 2/1975 | Chaffee | G01F 11/24 222/238 |
| 3,909,068 A | 9/1975 | Coucher | |

(Continued)

FOREIGN PATENT DOCUMENTS

| | | |
|---|---|---|
| JP | S62149364 B2 | 7/1987 |
| JP | 2613704 B2 | 5/1997 |

OTHER PUBLICATIONS

Department of Defense Manufacturing Process Standard, Materials Deposition, Cold Spray; Department of Defense; Metric MIL-STD-3021; Aug. 4, 2008; 19 pgs.

(Continued)

*Primary Examiner* — Joseph A Dillon, Jr.
(74) *Attorney, Agent, or Firm* — Cantor Colburn LLP

(57) ABSTRACT

A powder feeder for a cold spray system includes a rotatable drum body, a housing surrounding the drum body, and a support structure. The support structure couples to the housing and supports the housing such that the drum body rotates about a rotation axis to provide in-situ blending of powder disposed within an interior of the drum body.

14 Claims, 4 Drawing Sheets

(56) References Cited

U.S. PATENT DOCUMENTS

| | | | |
|---|---|---|---|
| 4,142,868 A * | 3/1979 | Gencsoy | C10J 3/30 |
| | | | 277/387 |
| 4,154,486 A | 5/1979 | Nishikawa | |
| 4,174,058 A * | 11/1979 | Bassignani | G01F 11/24 |
| | | | 222/438 |
| 4,234,272 A | 11/1980 | Laseter | |
| 4,376,600 A | 3/1983 | Egli | |
| 4,501,543 A * | 2/1985 | Rutledge | B29C 47/522 |
| | | | 264/169 |
| 4,528,848 A | 7/1985 | Hafner | |
| 4,681,484 A | 7/1987 | Egger | |
| 4,751,948 A | 6/1988 | Hertig et al. | |
| 4,832,235 A * | 5/1989 | Palmer | A47G 19/24 |
| | | | 222/370 |
| 4,865,092 A * | 9/1989 | Reichelt | G01F 11/24 |
| | | | 141/129 |
| 4,997,318 A | 3/1991 | Kostecki et al. | |
| 5,094,403 A | 3/1992 | Tschumi | |
| 5,118,224 A | 6/1992 | Gerritsen | |
| 5,356,599 A | 10/1994 | Miura et al. | |
| 5,433,519 A | 7/1995 | Irsch | |
| 5,549,144 A | 8/1996 | Dworak et al. | |
| 5,626,260 A * | 5/1997 | Waldner | G01F 11/24 |
| | | | 222/144 |
| 5,725,160 A | 3/1998 | Harper et al. | |
| 5,797,435 A | 8/1998 | Wada | |
| 5,997,220 A | 12/1999 | Wormser | |
| 6,050,308 A * | 4/2000 | Wurst | A61J 3/074 |
| | | | 141/146 |
| 6,098,675 A * | 8/2000 | Runft | B65B 1/363 |
| | | | 141/71 |
| 6,257,804 B1 | 7/2001 | Gathmann | |
| 6,305,884 B1 * | 10/2001 | Lewis | B05B 7/1404 |
| | | | 406/107 |
| 6,368,026 B1 | 4/2002 | Takazawa | |
| 6,471,447 B1 | 10/2002 | Salley | |
| 7,125,204 B2 | 10/2006 | Wysong | |
| 7,226,248 B2 | 6/2007 | Hafner et al. | |
| 7,237,699 B2 | 7/2007 | Zill et al. | |
| 7,438,507 B2 | 10/2008 | Scharger | |
| 7,891,527 B2 * | 2/2011 | Dentler | B01J 8/002 |
| | | | 222/333 |
| 8,051,971 B2 | 11/2011 | Marti Sala | |
| 8,353,644 B2 | 1/2013 | Dunlop et al. | |
| 8,734,061 B2 | 5/2014 | Terzini | |
| 9,309,063 B2 | 4/2016 | Soerensen et al. | |
| 2007/0193646 A1 | 8/2007 | Tapphorn et al. | |
| 2008/0014031 A1 | 1/2008 | Steenkiste et al. | |
| 2010/0264170 A1 * | 10/2010 | Chiu | G01F 11/003 |
| | | | 222/239 |
| 2010/0282781 A1 * | 11/2010 | Kinzie | G01F 11/24 |
| | | | 222/239 |
| 2014/0263465 A1 * | 9/2014 | Renyer | B65D 88/54 |
| | | | 222/352 |
| 2014/0329672 A1 | 11/2014 | Colclough, Jr. et al. | |
| 2016/0222520 A1 | 8/2016 | Kennedy et al. | |
| 2017/0203269 A1 * | 7/2017 | Ker | B01J 8/002 |

OTHER PUBLICATIONS

English Abstract for JP2613704B2; 2 pgs.
English Abstract for JP62-149364; 1 pg.
European Search Report for Application No. EP 14 84 8494; dated May 2, 2017 (7 pages).
PCT International Search Report for International Application No. PCT/US2014/049579; International Filing Date: Aug. 4, 2014; dated Nov. 21, 2014; 3 pgs.
PCT Written Opinion for International Application No. PCT/US2014/049579; International Filing Date: Aug. 4, 2014; dated Nov. 21, 2014; 4 pgs.

* cited by examiner

COLD SPRAY POWDER FEEDERS WITH IN-SITU POWDER BLENDING

RELATED APPLICAITONS

This application is a divisional application of Ser. No. 15/023,171, filed on Mar. 18, 2016, which is a National Stage Application of PCT/US2014/049579 filed on Aug. 4, 2014, which claims the benefit of and priority to U.S. Provisional Patent Application No. 61/883,880 filed Sep. 27, 2013, the contents each of which are incorporated herein by reference in their entirety.

BACKGROUND OF THE INVENTION

1. Field of the Invention

The present disclosure relates to cold spray systems, and more particularly to powder feeders for cold spray systems with in-situ power blending.

2. Description of Related Art

Cold spray material deposition processes are used to produce dense, pure, thick and well bonded coatings of metals and alloys on target substrates. These coatings typically include metals like aluminum, copper, and nickel, and can also include alloys such as Inconel®. The coatings can be used to form protective or performance enhancing layers, or ultra-thick coatings, on freeform or near net shape substrates. The coatings can also be used to form temperature protection coatings and bond coats for thermal barriers as well as to form protective layers for parts subject oxidation, wear, and/or corrosion. Cold spray is distinguishable from thermal spray in that it typically does not involve melting or near melting the material during the spray process. In contrast, thermal spray involves melting or partially melting the spray material prior to accelerating it the target substrate.

Cold spray processes function by accelerating relatively small particles in a solid state, e.g. a powder, to high velocities in the direction of a substrate target. The accelerated particles impact the substrate to form a continuous layer over the substrate surface. Impact of the accelerated particles disrupts the oxide films on the particles and substrate, pressing their respective atomic structures into intimate contact with one another under high interfacial pressures and temperatures, thereby developing an integral substrate/coating structure. Particles are can be accelerated using a preheated gas, the gas temperature usually lower than the melting temperature of the coating material, generally under 800° Celsius. In some cold spray processes, the gas temperature can be as low as room temperature.

Generally, in order for a cold spray system to develop an acceptable coating, material fed through the system need to be dry, thoroughly blended, and free flowing. This can be particularly challenging for powders comprised of homogenous materials with different sized particles. It can also be problematic for heterogeneous powder mixtures, i.e. mixtures including different constituent material—particularly where the different materials have different particle sizes. Such materials have a tendency to settle or stratify within the powder feeder over time. Stratification in turn causes the relative ratio materials feed through the cold spray system to change while developing the coating on the substrate. This can lead to coatings of non-uniform constitution, excessive porosity, and/or insufficient bond strength. While a concern for cold and thermal spray processes generally, stratification can be of particular concern in cold spray systems as blend mix consistency influences coating consistency, and influences bond strength, deposit density and/or co-deposition of distinct phases. For that reason, cold spray feeders typically employ either or both of mechanical vibration or fluidization for purposes of feeding material through the system.

Such conventional cold spray methods and systems have generally been considered satisfactory for their intended purpose. However, there is still a need in the art for a powder feeder that allows for improved powder feeding. There is a further need for powder feeders that provide in-situ powder blending. There also remains a need in the art for such a powder feeder that is mobile and easy to make and use. The present disclosure provides a solution for these problems.

SUMMARY OF THE INVENTION

A powder feeder for a cold spray system includes a rotatable drum body, a housing surrounding the drum body, and a support structure. The support structure couples to the housing and supports the housing such that the drum body rotates to provide in-situ blending of material disposed within the drum body.

The drum body can be angled such that material within the chamber is dragged upwardly by frictional force between the drum body and the material until the material reaches its angle of repose, at which point it tumbles toward a lower portion of the drum body interior. The drum body can rotate at an angle oblique with respect to vertical (i.e. with respect to gravity). The angle can be between about 30 degrees and about 60 degrees. The angle can be about 45 degrees.

In accordance with certain embodiments, the drum body includes can include a circumferential wall with an opening on a first end and two or more metering apertures on an opposed second end. The metering apertures can be offset from the rotation axis by a common radial distance. The metering apertures can be disposed on a pitch that uniformly separates adjacent metering apertures along a circumference of the drum body. A wall of the drum body can be textured or define a ribbed surface for facilitating blending.

It is contemplated that the powder feeder includes a drum rider contacting an interior surface of the drum body and fixed with respect to the drum body. The drum rider can include an internal blow down chamber coupled to a carrier gas tube and bounded by the drum body. A powder outlet tube opposite the blow down chamber can be fixed with respect to the drum rider. Rotation of the drum body can successively position metering apertures between the blow down chamber and powder outlet tube. Rotation of the drum body can place the carrier gas tube in fluid communication with each of the powder outlet tube through the blow down chamber, a tapered outlet chamber arranged below drum body, and at least one metering aperture arranged therebetween by rotation of the drum body.

It is further contemplated that the drum rider couple to the housing through a loosely fitting guide rod. The guide rod can include a resilient member configured to urge the drum rider against an interior surface of the drum body.

A powder feeder for a high-pressure cold spray system is provided. The powder feeder is similar to the above-described powder feeder and additionally includes a pressure vessel configured and adapted for sustaining an internal pressure of at least 800 pounds per square inch.

In certain embodiments, the drum body has an outer surface and the powder feeder includes a drum guide with a rotation surface. The rotation surface can contact the outer surface of the drum body to support the drum body during rotation. The drum guide can form a floor for respective metering apertures during a portion of revolution about the drum body axis for conveying powder within the metering aperture during rotation.

In accordance with certain embodiments, the drum guide has an annular shape and is configured and adapted for sealing an interior of the drum body from a portion of the housing interior. The drum guide can be a first drum guide and the powder feeder can include a second drum guide disposed between the housing and drum body and configured for maintaining an axial position of the drum body along its rotation axis. A third drum guide can be disposed between the housing and the drum body for maintaining the axial position of the drum body. One or more of the drum guides can have an annular shape and an L-shaped profile.

It is further contemplated that the housing be configured for drying and/or degassing material disposed within drum body by application of heat to the drum body. The housing can be configured and adapted for applying vacuum and/or a nitrogen purge to material to an interior of the drum body. The support structure can support the housing such that the drum body rotates about a rotation axis oblique with respect to vertical for tumbling material in the drum body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
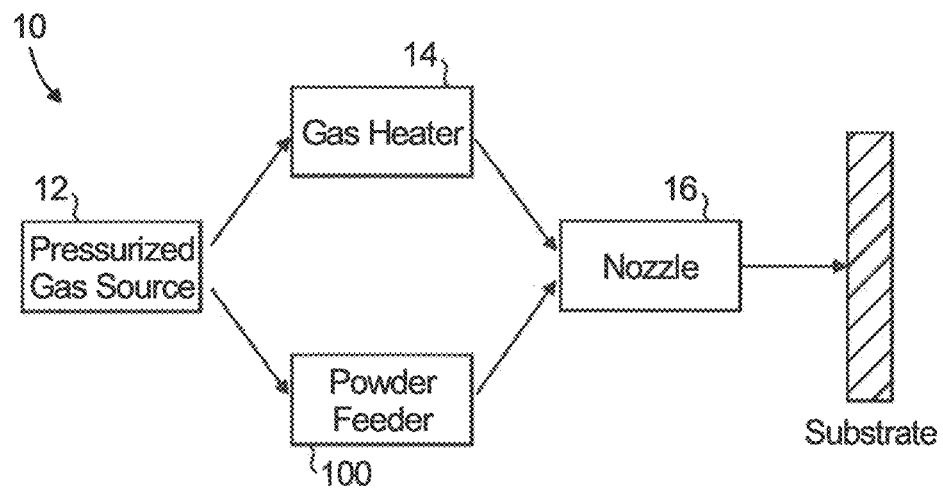
FIG. 1 is a schematic side view of an exemplary embodiment of a high-pressure cold spray system constructed in accordance with the present disclosure, showing a powder feeder plumbed in parallel with a gas heater between a gas source and a nozzle.

Reference will now be made to the drawings wherein like reference numerals identify similar structural features or aspects of the subject disclosure. For purposes of explanation and illustration, and not limitation, a partial view of an exemplary embodiment of the powder feeder in accordance with the disclosure is shown in FIG. 1 and is designated generally by reference character 100. Other embodiments of powder feeders in accordance with the present disclosure, or aspects thereof, are provided in FIGS. 2-6, as will be described. The systems and methods described herein can be used in spray systems, such as low-pressure and high-pressure cold spray and thermal spray systems for example.

FIG. 1 shows a high-pressure cold spray system 10. Cold spray system 10 includes a pressurized gas source 12, a gas heater 14, a powder feeder 100 and a nozzle 16. Powder feeder 100 and gas heater 14 are fluidly coupled between pressurized gas source 12 and nozzle 16, and are plumbed in parallel with one another. Pressurized gas source 16 is configured to pressurize a conveyance gas to pressures, for example to above 350 pounds per square inch (psi) (about 2.5 MPa) or above at least 800 psi (about 5.5 MPa). Gas heater 14 is configured to receive gas from pressurized gas source 12, heat the provide gas and supply the gas to nozzle 16. Powder feeder 100 is configured to receive conveyance gas from pressurized gas source 12 and utilize the conveyance gas to mobilize blended powder. It in turn provides the powder as a mixture of powder and conveyance gas to nozzle 16. Nozzle 16 combines the flows received from gas heater 14 and powder feeder 100, accelerates powder conveyed from powder feeder 100 and deposits the powder on a target substrate arranged opposite nozzle 16. Powder feeder 100 maintains and provides powder in a blended form with uniform distribution of differently sized particles and/or particles having different densities.

Figure 2:
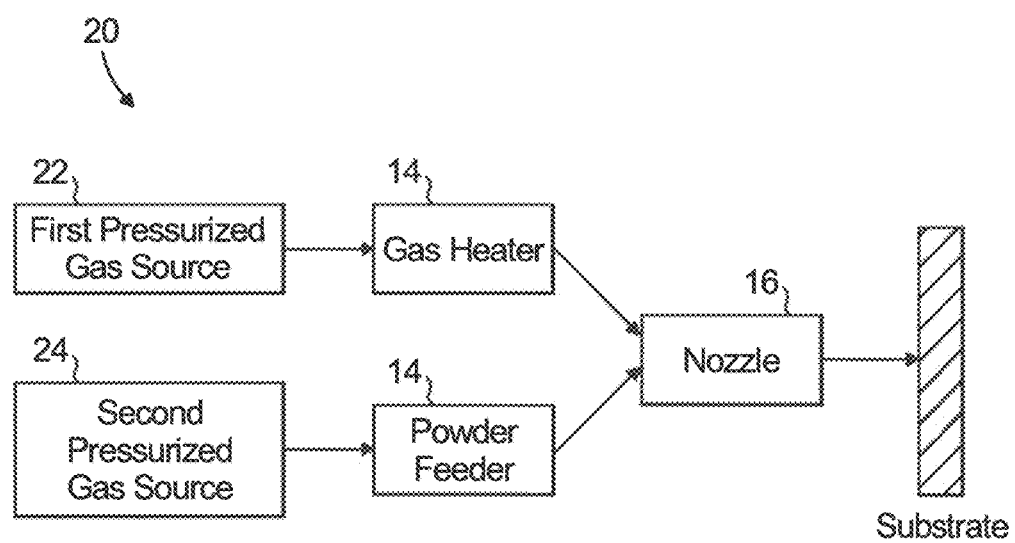
FIG. 2 is a schematic side view an exemplary embodiment of a low-pressure cold spray system constructed in accordance with the present disclosure, showing a powder feeder coupled to an independent gas source.

With reference to FIG. 2, a low-pressure cold spray system 20 is shown. Low-pressure cold spray system 20 is similar to high-pressure cold spray system 10 and additionally includes first and second pressurized gas sources 22 and 24. A gas heater 26 fluidly is coupled between first pressurized gas source 22 and a nozzle 28 and is configured to receive a first gas flow a relatively low pressure, e.g. 75 to 150 psi (about 0.5 to 1.0 MPa). Gas heater 26 heats the received gas and provides it to nozzle 28. Powder feeder 100 is fluidly coupled (plumbed) in series between a second pressurized gas source 24 and nozzle 28 and is configured to receive a conveying gas flow from second pressurized gas source 24. The conveying gas mobilizes blended powder within powder feeder 100 and carries the powder as powder/conveyance gas mixture to nozzle 28. Nozzle 28 combines the flows received from gas heater 26 and powder feeder 100, combines the flows and accelerates the powder toward a target substrate arranged opposite nozzle 28. As above, powder feeder 100 maintains and provides powder in a blended form with uniform distribution of differently sized particles and/or particles having different densities.

Figure 3:
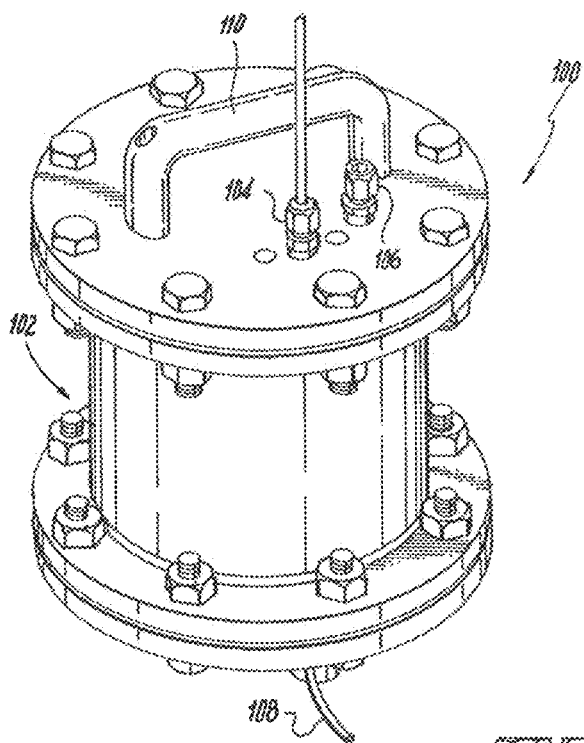
FIG. 3 is a perspective elevation view of the powder feeder shown in FIGS. 1 and 2, showing external features of the powder feeder.

With reference to FIG. 3, powder feeder 100 is shown. Powder feeder 100 includes a housing 102, an inlet port 104, a utility port 106, and an outlet port 108. Housing 102 is a pressure vessel configured and adapted for internal pressures of at least 650 psi. Housing 102 is configured and adapted for sustaining elevated internal pressures, for example internal pressures of at least 800 psi inch (5.5 MPa). As illustrated, powder feeder 100 is sized to be mobile and includes a support structure configured to maintain a rotation axis offset from vertical so as provide blended powder for a mobile cold spray operation.

Inlet port 104 is configured and adapted for connection with a conveying gas source, i.e. pressurized gas source 12 or 24, and is fluidly communicative with an interior of housing 102. Outlet port 108 is configured for supplying a powder-conveyance gas mixture under pressure to nozzle 16 or 28. Inlet port 104 is selectively placed into fluid communication with outlet port 108 through operation of powder feeder 100 as described below.

Utility port 104 is fluidly coupled to an interior of housing 102 and is configured for drying and/or degassing material disposed within powder feeder 100, such as by heating. Drying and/or degassing can be accomplished pulling vacuum through utility inlet 104, applying a nitrogen purge to an interior of housing 102, or alternately pulling vacuum and establishing a purge atmosphere within housing 102. Housing 102 is also configured for drying and/or degassing material disposed within powder feeder using an internal heating element 110 (shown in FIG. 5). Utility port 104 is configured and adapted for equalizing system pressure during system startup and shutdown, potentially simplifying operation of the apparatus.

Housing 102 can be designed per ASME Pressure Vessel Code to with a 800 psi design pressure at a 500° Fahrenheit uniform metal temperature, constructed from 316H stainless steel, and be formed from a flanged body and opposing end caps. The end caps attach the flanged body with A193 B7 steel hex bolts and A194 grade 7 steel hex nuts. This construction has the potential advantage of allowing for cold spray feeding at extremely high-pressures at temperatures below the melting point of blended powder within housing 102. Housing 102 is approximately 7 inches high and has a diameter of about 9 inches, providing compact structure that allows for mobile cold spraying and providing the potential advantage of flexibility in operation of cold spray systems 10 and 20. Housing 102 is configured and adapted for incorporation into an automated system using the illustrated inlet and outlet fittings, potentially providing a continuous flow of material. Housing 102 can also be configured and adapted for incorporation into a manual system suitable for supplying a continuous flow of material in a portable configuration, potentially providing further operational flexibility.

Housing 102 includes a handle 112 disposed on the end cap of housing 102. Handle 110 provides a lifting element for separating the end cap from the housing body of housing 102, thereby allowing access to the interior (shown in FIG. 5) of powder feeder 100. This facilitates servicing or cleaning powder feeder 100 as well as charging powder feeder 100 with material for a subsequent coating operation.

Figure 4:
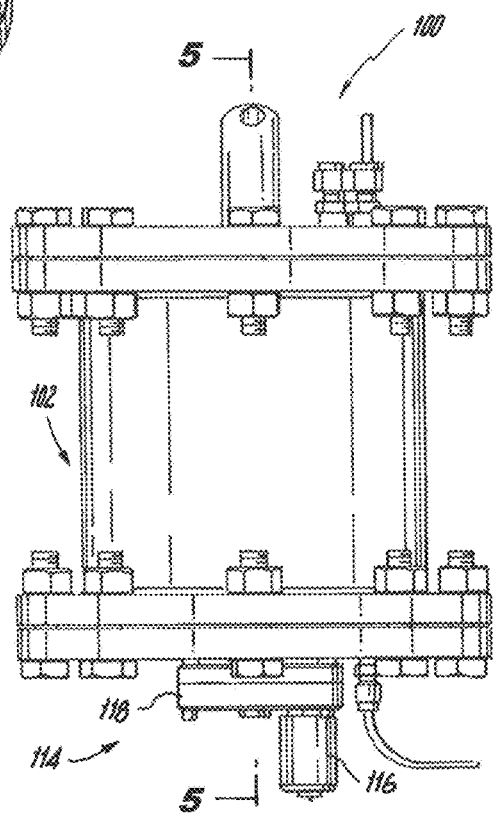
FIG. 4 is a side view of the powder feeder of FIG. 3, showing the drive mechanism engaged to the housing for rotating the drum body.

With reference to FIG. 4, powder feeder 100 includes a drive assembly 114. Drive assembly 114 couples to an end of housing 102. Drive assembly 114 sealably extends into housing 102 and mechanically engages a drum body 120 rotatably disposed therein (shown in FIG. 5). Drive assembly 114 includes a drive motor 116 and a reduction gearbox assembly 118.

As will be appreciated by those skilled in the art, powder feeder 100 may also include other components such as bushings, shaft, coupling and o-rings for purposes of sealably providing motive force to drum body 120 while maintaining high-pressure within housing 102.

Figure 5:
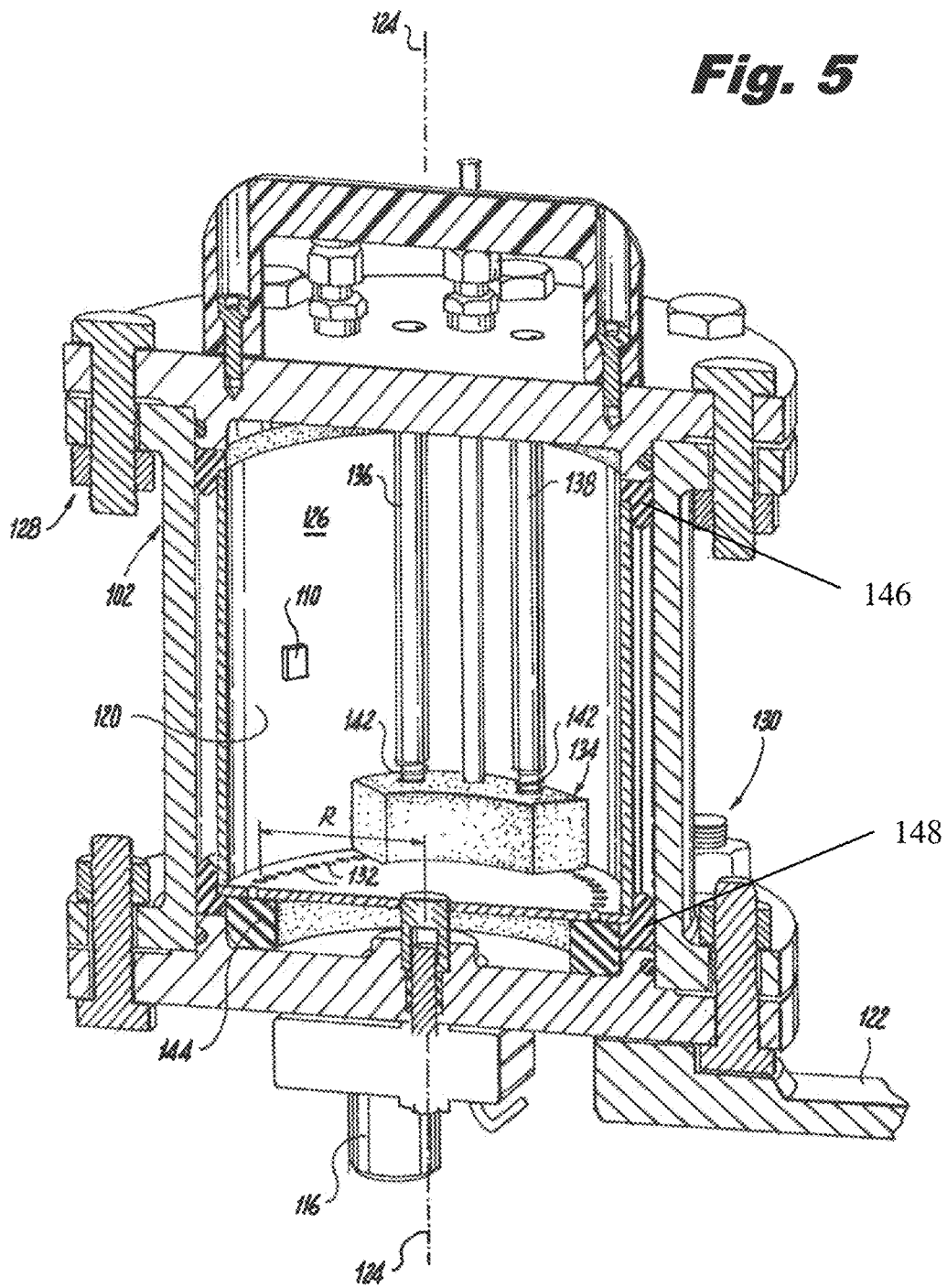
FIG. 5 is a cross-sectional side view of the powder feeder of FIG. 3, showing the drum body.

With reference to FIG. 5, powder feeder 100 is shown in cross-section. Powder feeder 100 includes a drum body 120 and a support structure 122. Drum body 120 is rotatably mounted within housing 102 such that drive motor 116 rotates drum body 102 about a rotation axis 124 of drum body 120. Support structure 122 couples to housing 120 and is configured for orienting housing 120 such that drum body 120 rotates about a rotation axis 124 obliquely, i.e. with a tilt angle (shown in FIG. 6) relative to the direction of gravity. This enable contents within drum body 120 to tumble as result of the rotation, thereby blending powder therein and providing a flow of blended powder of uniform constitution.

Drum body 120 includes a circumferential wall 126 with opposed inner and outer surfaces 150 and 152, a first end 128 and a second end 130. Drum body 120 is open on first end 128, thereby providing access to an interior of drum body 120 upon removal of the end plate. Drum body 120 defines two or more metering apertures 132 on opposed second end 130. Each metering aperture 132 is offset from rotation axis 124 by radial distance R. Adjacent metering apertures are separated from one another by a fixed circumferential distance (pitch) P (shown in FIG. 6). Uniform radial distance R and circumferential pitch P allow for control of the rate that powder feeds from drum body 120 by controlling rotation speed.

With continued reference to FIG. 5, powder feeder 100 also includes a plurality of drum guides 144, 146 and 148 for sealably supporting drum body 120 within housing 102 during rotation. First, second and third drum guides 144, 146 and 148 can provide sealing for the interior of drum body 120 from the environment external to the drum body in cooperation with o-rings arranged in apertures of housing 102. The o-rings can be constructed from a temperature tolerant material, such as Viton for example. Drum guides 144, 146 and 148 can be constructed from an anti-static material such as a graphite-filled PTFE, thereby controlling static charge accumulation and controlling enabling powder tumbling without static electric effects between powder particles and drum body 102.

First drum guide 144 has a rotation surface 154 and defines an annular shape. Rotation surface 154 contacts outer surface 142 of drum body 120 in portions surrounding metering apertures 132. This provides a sliding floor under the cavity defined by the metering apertures during most of rotation of drum body 120, restricting powder movement of drum body 120 through metering aperture 132 during rotation except when aligned as described below.

Second and third drum guides 146 and 148 have annular shapes and L-shaped cross-sectional areas, and are respectively disposed between housing 102 and outer surface 152 of drum body 120. First and second ends 128 and 130 rotatably seat within the L-shaped profile of second and third drum guides 146 and 148, drum body 120 being axially fixed between the second third drum guides 146 and 148.

A drum rider 134 is disposed within the interior of drum body 120. Drum rider 134 contacts an interior of surface of drum body 120, e.g. both floor portions and sidewall portions of drum body 120. Drum rider 134 is fixed with respect to drum body 120 axially opposite first drum guide 144 and is separated therefrom by the floor of drum body 120. A first and a second guide rod 136 and 138 loosely fit with drum rider 134. Resilient members 140 and 142 attached to first and second guide rods 136 and 138 urge drum rider 134 against the interior surface of drum body 120, such as with springs as illustrated in FIG. 5. This forces a lower face of drum rider 134 against the floor portion of drum body 120 and causes circumferentially oriented faces drum rider 134 to wipe the inner surface 150 of drum body 120, filling each metering aperture 132 with powder as it rotates under drum rider 134. This sweeping action forces powder charges into each the metering aperture 132 of similar size and enables consistent powder feed rate for a given rotation speed of drum body 120.

Figure 6:
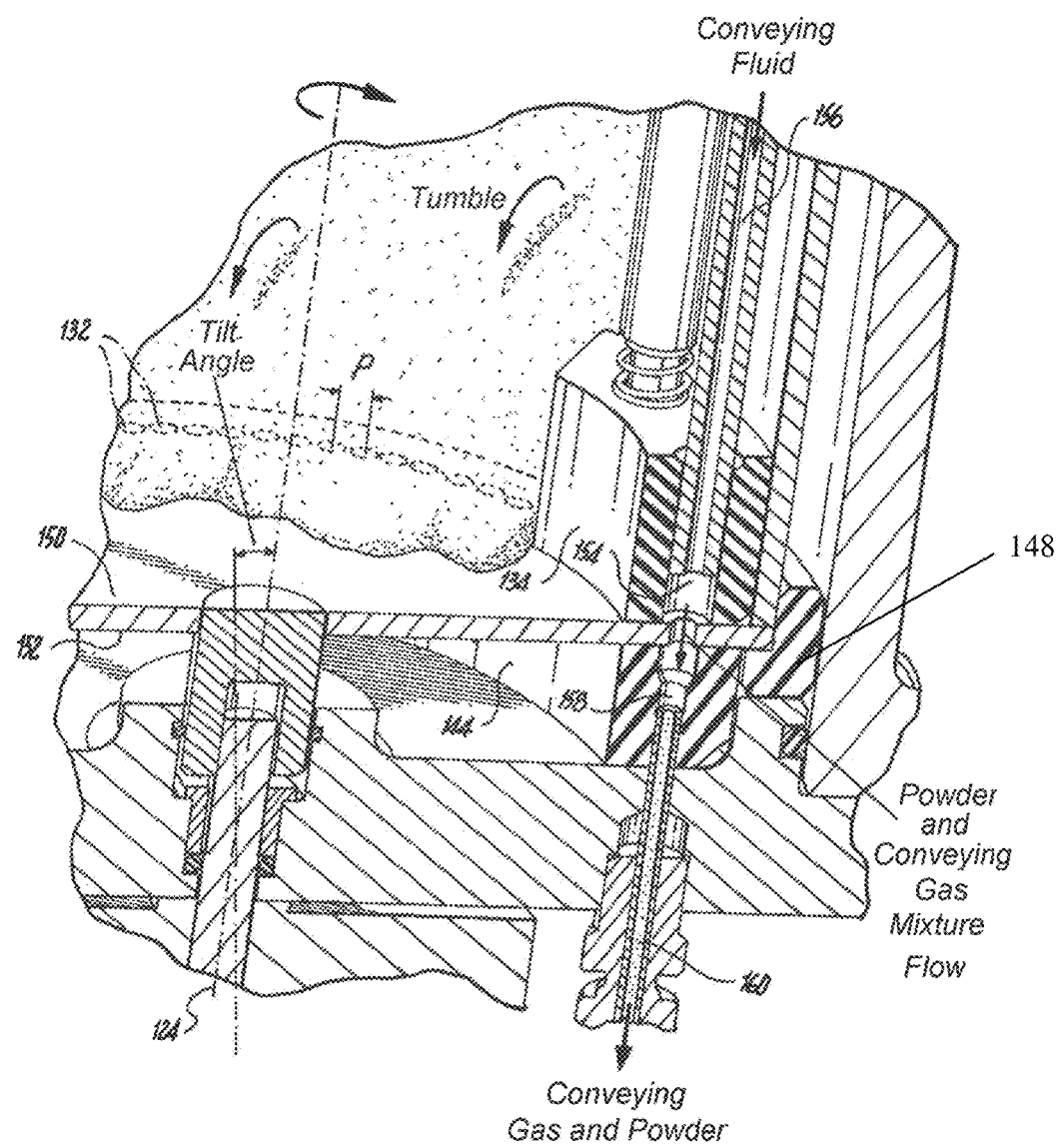
FIG. 6 is a partial cross-sectional side elevation view of the powder feeder of FIG. 3, showing the construction of drum rider, first drum guide, and powder tumbling within the drum body.

With reference to FIG. 6, drum rider 134 and first drum guide 144 are shown in cross-section in relation to metering apertures 132. Drum rider 134 has an internal blow down chamber 154 with a diameter defined within the body of the drum rider. A carrier gas tube 156 couples to blow down chamber 154 on one end. Carrier gas tube 156 is configured to supply pressurized conveying gas to blow down chamber 154, such as air or an inert gas like nitrogen. A movable portion of inner surface 150 of drum body 120 bounds blow down chamber 154 on a side opposite carrier gas tube 156. As drum body 120 rotates metering apertures 132 successively enter and exit blow down chamber 154, presenting and exposing their respective powder charges to the atmosphere within blow down chamber 154.

First drum guide 144 defines an outlet chamber 158. Outlet chamber 158 is bounded on one end by a movable portion of outer surface 152 of drum body 120 and is fluidly coupled to an outlet tube 160 on a side opposite outer surface 152. Outlet chamber 158 is axially aligned with blow down chamber 154. Each of outlet chamber 158 and blow down chamber 154 are radially offset from rotation axis R such that rotation of drum body 120 sequentially positions metering apertures 132 axially between blow down chamber 154 and outlet chamber 158. When no metering apertures are present between blow down chamber 154 and outlet chamber 158, pressure in blow down chamber 154 exceeds that of outlet chamber 158. When a metering aperture 132 initially presents itself between blow down chamber 154 and outlet chamber 158, the pressure differential forces powder within the aperture into outlet chamber 158. Conveying fluid continues to flow through the aperture once the powder passes, forcing the powder into outlet tube 160 and into cold spray nozzle 16/26 as described above. This provides cyclic charges of powder to nozzle 16/26 at rate corresponding to sequencing of metering apertures 132 placed between blow down chamber 154 and outlet chamber 158. The rate of sequencing in turn is a function of drum body rotation speed, metering aperture size (diameter), and metering aperture 132 radial offset distance from rotation axis 124.

Blow down chamber 154 can be configured and adapted to completely evacuate material from metering apertures 132 during operation, such by having a larger diameter above the floor of drum body 102 than metering apertures 132. In embodiments, outlet chamber 158 can have a larger diameter than metering apertures. Edges of blow down chamber 154, metering apertures 132, and outlet tubing 160 can be formed to reduce the likelihood of material becoming entrapped between the interface of moving and stationary surfaces with the feeder. For example, sharp edges with small edge breaks (e.g. very little chamfering) can be defined at such interfaces, thereby reducing the tendency of powder blends to pack in blow down chamber 154 and outlet chamber 158. In embodiments where the diameter of outlet chamber is greater than the diameter of outlet tubing 160, the tapered segment bounding the segments is distally disposed with respect to the floor of drum body 102. This facilitates continuous flow of material through the powder feeder. In embodiments, such feature(s) facilitate feeding fine powders, e.g. powders having particle sizes between about 10 microns and about 40 microns in size.

It is contemplated that rotation axis 124 is obliquely oriented with respect to vertical by an angle in the range of about 30° to about 60° from vertical. As will be appreciated by those skilled in the art, the angle of repose of a material (or blend) is peculiar to the specific material (or blend), so the specific offset angle is a function of the material occupying drum body 120.

Tilting rotation axis 124 of drum body 120 effects blending of powder remaining within drum body 120 as metering apertures 132 sequence between blow down chamber 154 and outlet chamber 158 because particles adjacent an internal wall of drum body 120 tend to adhere to the wall, such from frictional or particle charging effects. As the tilted drum body rotates the force of gravity on adhered particles increases to the point at which gravity overcomes the adherence force, at which point the particle tumbles to the base of drum body 120. This effects continual blending of material within drum body 102. Blending in turn prevents separation due to size and density differences in the blended particles, enabling development of uniform constitution coating on a substrate targeted by a cold spray system employing powder feeder 100.

Interior surfaces of drum body 102 can be textured. Textured interior surfaces increase frictional forces between powder housing within the drum body and interior surfaces of drum body, potentially increasing tumbling of material within drum body 102 by increasing the tendency of powder to adhere to the wall surface during rotation, facilitating blending. Drum body 102 can also include rib structures, potentially improving tumbling.

The methods and systems of the present disclosure, as described above and shown in the drawings, provide for powder feeders for cold spray systems with superior properties including powder tumbling action within the feeder. The tumbling action of the powder within the powder feeder thoroughly blends the powder, thereby ensuring blend uniformity and removing powder contamination through drying and degassing. While the apparatus and methods of the subject disclosure have been shown and described with reference to preferred embodiments such as high-pressure cold spray systems, those skilled in the art will readily appreciate embodiments of the powder feeders described herein can be employed in low-pressure cold spray systems as well as in thermal spray systems. Those skilled in the art will also readily appreciate that changes and/or modifications may be made thereto without departing from the spirit and scope of the subject disclosure.

What is claimed is:

1. A powder feeder for a high-pressure cold spray system, comprising:
- a rotatable drum body having a plurality of metering apertures;
- a drum rider for contacting an interior surface of the drum body as it rotates, the drum rider being fixed with respect to the drum body, wherein the drum rider has an internal blow down chamber coupled to a carrier gas tube;
- an outlet tube opposite the internal blow down chamber and fixed with respect to the drum body, wherein rotation of the drum body successively positions the metering apertures between the blow down chamber and the outlet tube;
- a drum guide having a rotation surface, the rotation surface contacting and supporting an outer surface of the drum body as the drum rotates;
- a housing surrounding the drum body; and
- a support structure coupled to the housing, wherein the support structure is configured and adapted for supporting the housing such that the drum body rotates for blending material disposed therein, wherein the housing is a pressure vessel configured and adapted for sustaining an internal pressure of at least 800 pounds per square inch (5.5 MPa).

2. A powder feeder as recited in claim 1, further comprising a heating element for drying and/or degassing material disposed within the drum body.

3. A powder feeder as recited in claim 2, further comprising a utility port for applying a vacuum and/or a nitrogen purge to material located in an interior of the drum body.

4. A powder feeder as recited in claim 1, wherein the support structure supports the housing such that the drum body rotates about a rotation axis oblique with respect to vertical for tumbling material in the drum body.

5. A powder feeder as recited in claim 1, wherein the rotation axis is about a rotation axis oblique with respect to vertical.

6. A powder feeder as recited in claim 1, wherein the drum body has a circumferential wall with an opening on a first end and the plurality of metering apertures are located on an opposed second end.

7. A powder feeder as recited in claim 6, wherein the metering apertures are offset from the rotation axis by a common radial distance.

8. A powder feeder as recited in claim 1, further including a tapered outlet chamber defined within the drum rider and configured such that cyclically places carrier gas tube in fluid communication with the outlet tube through the blow down chamber and outlet chamber through sequential adjacent metering apertures.

9. A powder feeder as recited in claim 1, wherein the drum rider is coupled to the housing through a loosely fitting guide rod.

10. A powder feeder as recited in claim 9, wherein the guide rod includes a resilient member configured to press the drum rider against the drum body.

11. A powder feeder as recited in claim 1, wherein the drum guide has an annular shape and is configured and adapted for sealing an interior of the drum body from a portion of the housing interior.

12. A powder feeder as recited in claim 1, wherein the drum guide is a first drum guide and further including a second drum guide disposed between the housing and drum body and configured for maintaining an axial position of the drum body along its rotation axis.

13. A powder feeder as recited in claim 11, wherein the drum guide has an annular shape and an L-shaped profile.

14. A powder feeder as recited in claim 12, further comprising a third drum guide disposed between the housing and the drum body and configured for maintaining an axial position of the drum body.

* * * * *